Dec. 31, 1963 GEORG-WILHELM OETJEN ETAL 3,116,122

METHOD AND MEANS FOR CONDENSATION OF VAPORS

Filed April 22, 1960 2 Sheets-Sheet 1

INVENTORS
Georg-Wilhelm Oetjen
Wilhelm Nerge &
Friedrich Fauser

BY George H. Spencer

ATTORNEYS

METHOD AND MEANS FOR CONDENSATION OF VAPORS

Filed April 22, 1960 2 Sheets-Sheet 2

INVENTORS
Georg-Wilhelm Oetjen
Wilhelm Nerge &
Friedrich Fauser
BY George H. Spencer
ATTORNEY United States Patent Office 3,116,122
Patented Dec. 31, 1963

3,116,122
METHOD AND MEANS FOR CONDENSATION OF VAPORS

Georg-Wilhelm Oetjen, Cologne-Marienburg, Wilhelm Nerge, Rodenkirchen, near Cologne, and Friedrich Fauser, Cologne-Mulheim, Germany, assignors, by mesne assignments, to Leybold-Anlagen Holding A.G., Zug, Switzerland Filed Apr. 22, 1960, Ser. No. 24,051
Claims priority, application Germany Apr. 25, 1959
13 Claims. (Cl. 34—15)

The present invention relates to a novel method of, and apparatus for, separating condensable vapors from a material or object to be dried under vacuum conditions, especially water vapor, wherein these vapors are pumped out of a vessel and are condensed in a condenser system.

Apparatus for condensation purposes and for pumping-off condensable vapors are already well known, wherein these condensable vapors are obtained in greater quantities by employing various types of vacuum drying processes as, for example, with the drying of cables. In such systems, there are employed several different size blower units of the Roots-type blower which are arranged in series, a gas ballast pump being provided for the high pressure stage.

Between the individual blowers having rotary vanes, i.e., between the blower unit positioned closest to the high pressure stage and the high pressure stage, there are provided condensers of known construction supplied by a water cooling system. In such known arrangements, it is necessary to provide bypass conduits for the blowers and the condensers which are situated between them. These bypass conduits have to be closed or opened, respectively, by means of valves, depending upon the individual steps of the process performed. An evacuation system of this type, provided with a condensation apparatus, obviously, requires large expenditures for maintenance, since a considerable number of valves have to be subsequently actuated, depending upon certain pressure values determined by measuring devices associated therewith.

A simplified arrangement has already been proposed wherein, by means of a single blower unit of the rotary vane type in communication with a twin condenser, it is possible to separate large quantities of condensable vapors. Such a twin condenser contains a normal or regular cooling part and a quick-freezing part. The process is so controlled that a vessel is initially evacuated by means of a first stage pump to a pressure value corresponding to the temperature of the normal cooling part. Prior to this, the blowing units are bypassed and the normal cooling part of the condenser is turned on. The condensation of the vapors is discontinued at the normal cooling part of the condenser and the condensation at the quick-freezing part thereof is thereafter continued until the partial pressure of the water vapor has reached a value corresponding to the temperature of the quick-freezing part. For fine evacuation, the bypassing of the blower units is eliminated and such blower units then operate as a pre-condenser.

Although such an arrangement constitutes a great improvement over systems heretofore known, there is still a great need for increasing the efficiency thereof. It is especially desirable to decrease the period of time spent in executing the various steps of the method in addition to decreasing the overall physical dimensions of the apparatus.

In accordance with the present invention, there are thus provided in the condenser apparatus means for surface condensation and for injection condensation in such a manner that the fluid condensing medium is sprayed onto the condensing surface of a surface condenser and participates in a heat exchange with this surface. Such an arrangement has proved to increase greatly the condensation effect obtained, and to reduce considerably the amount of time which was required heretofore in known condensing systems, up to as much as 30%.

The injection of liquid spray condensing mediums as an effective method for condensation of vapors has been known and is frequently used. However, its use with condensation processes under vacuum conditions necessitated that there be developed a system where, in addition to injection condensation, surface condensation also be used. This is necessary, because in the region of small pressure values, below 10 mm. Hg, difficulties are encountered when spraying the liquid condensing medium, so that this process by itself does not achieve as efficient a condensation effect as is obtained when working in areas of higher pressures.

The present invention contemplates the use of both a spray injection condensation effect and surface condensation, wherein the vapors and the fluid spray medium are brought into contact with cooling coils through which is circulating a suitable coolant. Suitable pump means are provided for drawing off vapors from the material to be dried and directing them into a condenser housing. Here, the vapors are initially condensed by subjecting them to a fluid condensing medium which is sprayed into the condenser housing and in the direction of the cooling coils. The sprayed condensing medium drips down between the individual coils in droplets and adheres thereto to form a thin layer of liquid condensate, which condensate is additionally cooled by heat exchange with the coolant, the temperature of which is varied in accordance with the freezing temperature of the liquid spray medium and the steps of the method. By utilizing the method and apparatus of the present invention, liquid spray mediums of relatively high temperatures may be employed, since they are cooled upon contact with the cooling coils. The difference in temperature between the vapors to be condensed and the liquid condensing means increases constantly, due to the contact of the latter with the surface condenser. In the case of condensing and removing water vapors as, for example, when drying cables or cuts of perlon, the injection fluid used is likewise water and the cooling of the surface of the condenser coils is effectuated by circulating therethrough a suitable coolant treated by a refrigeration apparatus. The condenser housing collects the condensed vapors and fluid spray medium, recirculates the same so that there is achieved a considerable saving in the quantity of fluid spray medium needed to be added to the system. The invention further provides various control elements for regulating the flow of spray medium through the system and removal of the same, the specific details of which will be more extensively discussed hereinafter.

Accordingly, it is an object of the present invention to provide a novel apparatus and method for removing and condensing vapors from a material to be dried in an economical and reliable manner.

It is another object of the present invention to condense vapors and the like by subjecting the same to a fluid spray condensing medium and to a surface condenser.

It is a further object of the invention to provide means for controlling the temperature of a coolant with respect to the freezing temperature of a liquid spray condensing medium.

It is a still further object of the invention to provide means permitting recycling of condensate into a condensing system.

It is an additional object of the present invention to provide a two-stage condensation of vapors where initially the vapors are condensed by a liquid spray medium and then said previously condensed vapors and said spray medium are further condensed by contact with a surface condenser through which a suitable coolant flows.

Additional objects and advantages of the present invention will become apparent upon consideration of the following description when taken in conjunction with the accompanying drawings, in which.

Figure 1:
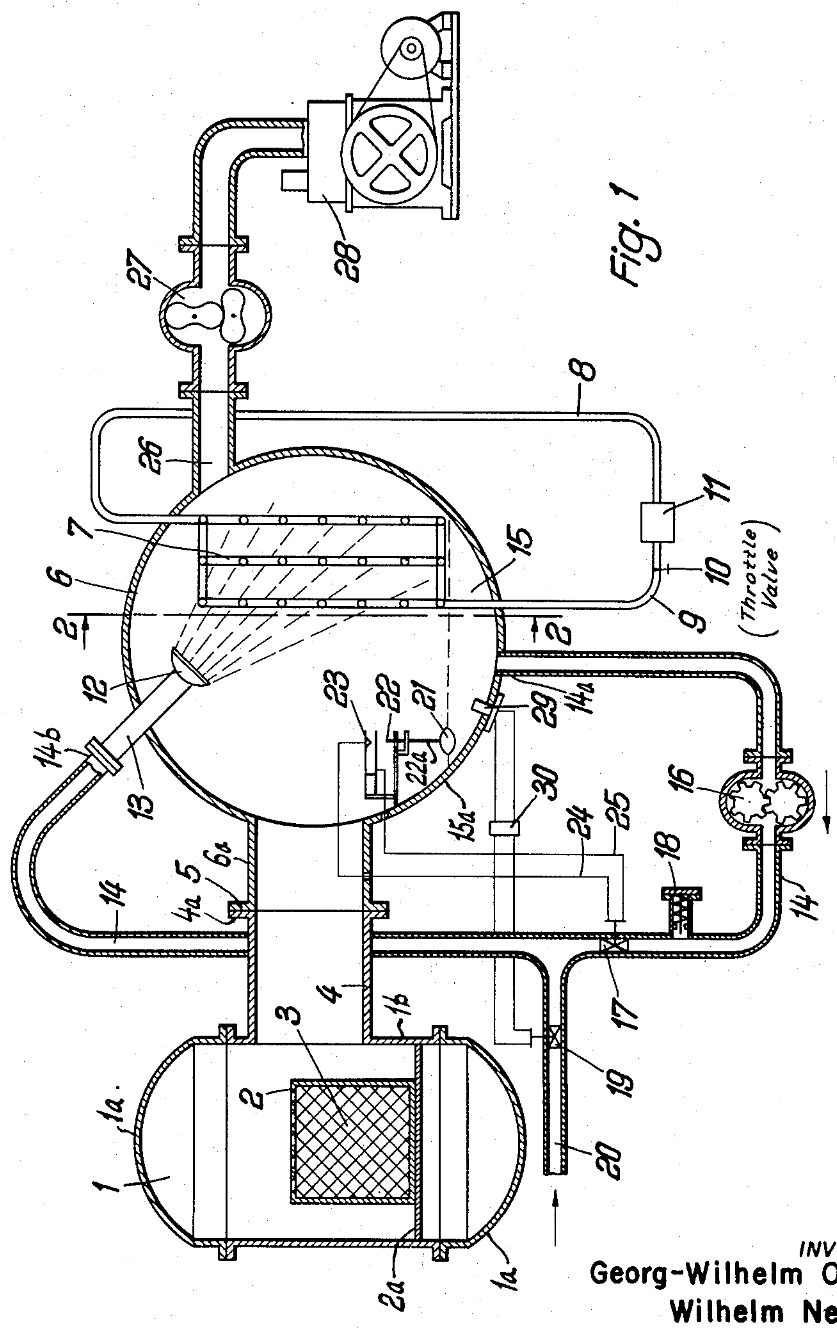
FIGURE 1 illustrates a partially schematic side view of a material drying system and condenser apparatus in accordance with the present invention.
Figure 2:
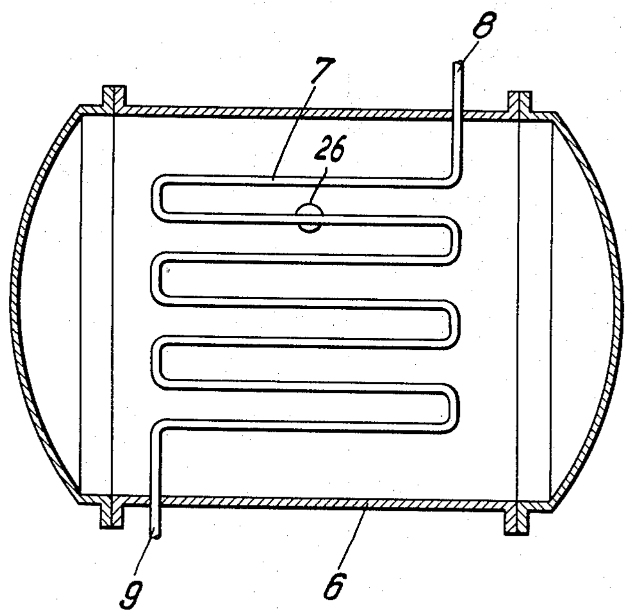
FIGURE 2 is a sectional view taken along line 2—2 of the condenser apparatus shown in FIGURE 1.

Referring in detail to the drawings, there is illustrated a chamber or vessel 1 provided with upper and lower dome portions *1a* to define a hermetically sealed compartment. A foraminated container 2, adapted to receive objects 3 to be dried, is located interiorly of the vessel 1 and rests on a support member *2a* adjacent to the lower dome *1a*. The side wall *1b* of the vessel 1 is provided with a laterally extending pipe 4 having a radially extending flange portion *4a* bearing against the flange portions 5 of a pipe *6a* communicating with a tubular condenser housing 6. The pipes 4 and *6a* define a path of travel for vapors removed from the material 3 located in the vessel 1 into the condenser housing 6.

A spiral or undulating cooling coil 7, serving as an evaporator, extends into the interior of the condenser housing 6 to define a surface condenser. The cooling coil 7 is connected by means of delivery pipes 8 and 9 to a refrigeration compressor system 11 which delivers a coolant to the cooling coil 7. The temperature of the surface condenser is controlled by means of a throttle valve 10 carried in the delivery pipe 9 forwardly of the refrigeration system 11, for regulating the flow of coolant through the cooling coil. Thus, a closed cooling circulation system is formed.

An injection system adapted to deliver a suitable fluid spray condensing medium is further provided in the condenser housing 6. The injection system consists of a spray nozzle 12 extending in the direction of the oppositely arranged cooling coil 7. The spray nozzle 12 is provided with a series of perforations enabling it to deliver a finely dispersed spray of fluid condensing medium in the direction of and onto the turns of the cooling coil 7 of the surface condenser. The bottom portion of the condenser housing 6 is provided with a condensate collecting chamber 15 adapted to collect the condensed vapors and fluid spray medium.

A recycling system comprising a flexed main recirculation pipe 14 communicates at one end *14a* with the collecting chamber 15 and at its opposite end *14b* with an inlet pipe 13 secured to the spray nozzle 12. A liquid pump 16 serving to recirculate the condensate collected in the collecting chamber 15 is associated with the recirculation pipe 14. Additionally, there is provided in the main pipe 14 a pressure relief valve 18 which opens outwardly to remove the condensate exteriorly of the recycling system. An electromagnetically actuated shutoff valve 17, arranged within the main pipe 14 forwardly of the liquid pump 16 and relief valve 18, is actuated by a float member 21 provided with a push rod *22a*, one end 22 of which is adapted to close a contact switch 23 for energizing the shutoff valve 17 through the intermediary of conductors 24 and 25.

A branch pipe 20 communicates with the recirculation pipe 14 and is provided with an electromagnetically operated shutoff valve 19. Secured to the bottom wall *15a* of the condenser housing 6 there is provided a temperature sensing element 29 which controls the electromagnetic shutoff valve 19 by means of a switching member 30. Thus, if there is a temperature increase in the collecting chamber 15, additional fluid spray condensing medium may be fed into the system via the branch pipe 20.

An intake manifold 26 is provided adjacent to the cooling coils of the surface condenser and communicates with a gas ballast pump 28 through the intermediary of a forwardly disposed rotary vane blower 27. The pump means 27 and 28 serve to draw off vapors continuously from the material 3 to be dried and conduct these vapors into the condenser housing 6 for subsequent treatment by the injection system and surface condenser. The rotary vane blower 27 of the Roots-type and the gas ballast pump 28 may be replaced by other known pumping systems. Under certain operating conditions, it may be advantageous to effect a pre-condensation step by inserting a suitable blower unit, preferably of the Roots-type, between the chamber 1 and the condenser housing 6.

The operation of the system requires that, during the initial stage of operation, the refrigeration apparatus 11 and the blower 27 and gas ballast pump 28 be started. Consequently, the coolant begins to circulate through the cooling coils 7 and is maintained at a temperature above the freezing temperature of the spray medium by means of the throttle valve 10 which is in throttled condition. The spray nozzle 12 directs a stream of fluid condensing medium in contact with the vapors removed from the material 3 to be dried by the pump means 27 and 28, and also directs this stream onto the surface of the cooling coil 7. The condensate collected in the collecting chamber 15 may be recycled back through the spray nozzle 12 by the liquid pump 16. In the event the level of the liquid appearing in the collecting chamber 15 reaches undesirable proportions, the contact switch 23 is brought into the closed position by means of the upper end 22 of the push rod *22a*, thereby closing the shutoff valve 17. The liquid pump 16 then removes the surplus condensate from the system by opening the high pressure relief valve 18. Similarly, if the temperature of the condensate increases above a desired level, the temperature sensing member 29 opens the shutoff valve 19 by means of the switching element 30, so that additional cool spray medium may be brought into the system via branch pipe 20.

Upon completion of the coarse drying of the material, i.e., after termination of the initial stage of the process, spraying of the fluid condensing medium is discontinued by closing the electromagnetic shutoff valve 17. The condensate collected in the chamber 15 can be removed from the system through the pressure relief valve 18. Thereafter, the liquid pump 16 may be shut off. The refrigeration system 11 is now operated at full capacity by opening throttle valve 10, so that the temperature of the coolant is reduced below the freezing temperature of the fluid spray medium. Consequently, an additional quantity of vapor residue within the material 13 is drawn off and vapor residue freezes to the cold wall surface of the condenser cooling coils 7. After a desirable low partial pressure of the water vapor has been achieved in the material handling vessel 1, further evacuation can be discontinued by shutting off the pump means 27 and 28 and the material 3 to be dried is now ready for further processing, as for example, impregnation.

The method of the present invention contemplates carrying out the condensation of vapors and the like, which have been removed from a material to be dried, in what may be conveniently described as a two-stage process. Initially, a coarse evacuation or condensing process occurs, wherein the coolant circulating within the cooling coil 7 of the surface condenser is maintained at a temperature above the freezing point of the fluid spray condensing medium while injection of the spray into the condenser housing 6 occurs. The spray medium is directed onto the surface of the cooling coil 7 and by keeping the coolant above the freezing temperature of the spray medium, freezing thereof to the surface of the cooling coil 7 is avoided. It is quite important that such freezing be avoided, in order to obtain the maximum efficiency of the injection condensation stage. The temperature control of the cooling coil 7 will be effectuated by controlling the flow of coolant from the refrigeration system 11 into cooling coil 7 by means of the throttle valve 10. Prior to initiating the second stage of the process, the fluid spray medium and condensed vapors located in the collecting chamber 15 of the condenser housing may be removed.

The second stage of the condensation process eliminates and condenses the remaining vapors from the material to be dried. The spraying of the fluid medium in the direction of the cooling coil 7 is terminated. The coolant circulating through the cooling coil 7 is reduced in temperature below the freezing temperature of the spray medium.

When operating the apparatus during removal of water vapor, it has been found advantageous to keep the temperature of the surface condenser in the range of approximately 0.5° C. to 2° C. when the fluid spray condensing medium is being injected, and in the temperature range of approximately 0° C. to −50° C. after the injection step is terminated. The contact of the initially condensed vapors and the spray medium with the surface of the cooling coil 7 effectuates further condensation in a highly reliable and efficient manner.

It will be understood that the above description of the present invention is susceptible to various modifications, changes and adaptations, and the same are intended to be comprehended within the meaning and range of equivalents of the appended claims.

We claim:

1. A method of removing condensable vapors and the like from a material to be dried comprising the steps of drawing off a quantity of condensable vapors under vacuum conditions from a material to be dried, thereafter subjecting said condensable vapors to a supply of fluid spray medium for condensing said condensable vapors, thereafter discontinuing the supply of said fluid spray medium, drawing off an additional quantity of condensable vapors under vacuum conditions from the material to be dried, and applying a coolant to said additional quantity of condensable vapors so as to provide condensation thereof, said coolant being kept above the freezing temperature of said fluid spray medium during supply of said fluid spray medium, and below the freezing temperature thereof when discontinuing said supply of fluid spray medium.

2. A method of removing condensable vapors and the like according to claim 1, wherein said fluid spray medium is water, said coolant is in the temperature range of 0.5° C. to 2° C. when said vapors are subjected to said fluid spray medium, and in the temperature range of 0° C. to −50° C. when the supply of fluid spray is discontinued.

3. A method of removing condensable vapors and the like from a material to be dried comprising the steps of: subjecting a material to be dried to vacuum conditions to remove vapors therefrom, applying to said vapors a supply of a liquid spray condensing medium in the direction of a coolant circulating in a cooling coil and kept at a temperature which is above the freezing temperature of said spray medium for condensing said vapors, at least some of said condensed vapors and said spray medium collecting on the surface of said cooling coil, thereafter discontinuing supplying said spray medium, and reducing the temperature of said coolant below the freezing point of said spray medium for condensing an additional quantity of condensable vapors from the material under vacuum.

4. A method of removing condensable vapors and the like according to claim 3, wherein said liquid spray condensing medium is water, the temperature of said coolant when held above the freezing temperature of said liquid spray medium being in the range of approximately 0.5° to 2° C. and in the range of approximately 0° C. to −50° C. when said coolant is below the freezing temperature of said liquid spray medium.

5. A method of removing condensable vapors and the like from an object to be dried comprising the steps of separating within a vacuum chamber a quantity of condensable vapor from an object to be dried, directing a liquid spray condensing medium into the vacuum chamber and into contact with said quantity of condensable vapor so as to produce condensation thereof, collecting as a liquid body in the vacuum chamber the liquid spray medium, discontinuing the supply of said liquid spray medium into the vacuum chamber, eliminating from the vacuum chamber as a liquid the liquid body, thereafter separating an additional quantity of condensable vapor from the object to be dried and providing a cold wall surface within the vacuum chamber so as to produce condensation thereon of said additional quantity of condensable vapor.

6. The method according to claim 5 wherein said step of eliminating from the vacuum chamber as a liquid the liquid body comprises the step of emptying the vacuum chamber of liquid spray medium and said condensed quantity of condensable vapor before separating said additional quantity of condensable vapor, and further including the step of reducing the pressure in said vacuum chamber to below 10 mm. Hg while condensing said additional quantity of condensable vapor on said cold wall surface.

7. In an apparatus for drying a material and the like by removal of condensable vapors therefrom comprising a vacuum housing adapted to contain the drying material, vacuum pump means for evacuating said vacuum housing, condenser means comprising a condensate collecting chamber communicating with said housing, said condensate collecting chamber and said housing being vacuum sealed so as to permit the attainment of pressures below 10 mm. Hg, a cooled coil defining a path of travel for a coolant, an oppositely arranged spray nozzle for delivering a supply of fluid spray condensing medium to the condensable vapors in the direction of said cooling coil, means associated with said cooling coil for controlling the flow of coolant therein, means for controlling the flow of fluid spray condensing medium into said condensate collecting chamber, means for emptying said condensate collecting chamber of said fluid spray condensing medium and the condensed vapors from the drying material, and refrigeration means adapted to cool said cooling coil to temperatures below 0° C.

8. An apparatus for drying a material and the like according to claim 7, including recycling means in communication with said spray nozzle and said condensate collecting chamber for recirculating condensate into said condenser means through the intermediary of said spray nozzle.

9. An apparatus for drying a material and the like according to claim 7, wherein said cooling coil serves as a cooler for condensing vapors and said fluid medium by heat exchange with said coolant.

10. In an apparatus for drying a material and the like arranged in a housing by removal of condensable vapors therefrom, condenser means comprising: a condensate collecting chamber communicating with said housing; a cooling coil defining a path of travel for a coolant and an oppositely arranged spray nozzle for delivering a supply of a fluid spray condensing medium to said vapors in the direction of said cooling coil; a supply of fluid condensing medium communicating with said spray nozzle; means in communication with said cooling coil for controlling the temperature of a coolant therein with respect to the freezing temperature of the fluid spray condensing medium emanating from said spray nozzle; and recycling means in communication with said spray nozzle and said condensate collecting chamber for recirculating condensate into said condenser means through the intermediary of said spray nozzle, said recycling means including a main pipe in communication with said spray nozzle and said condensate collecting chamber, and a pressure relief valve disposed in said main pipe permitting removal of said fluid medium exteriorly of said recycling means.

11. An apparatus for drying a material and the like according to claim 10, said recycling means including a branch pipe communicating with said main pipe for supplying additional fluid medium to said spray nozzle, a shutoff valve disposed in said branch pipe, temperature-responsive means located in said condensate collecting chamber and associated with said shutoff valve for actuating the latter and thereby controlling said supply of additional fluid medium.

12. An apparatus for drying a material and the like according to claim 10, said recycling means further including pump means situated adjacent said collecting chamber and in communication with said main pipe, a shutoff valve carried by said main pipe forwardly of said pump means for controlling supply of said fluid medium to said spray nozzle and through said pressure relief valve, and liquid level-responsive means carried by said collecting chamber in communication with said shutoff valve for actuating the same.

13. An apparatus for drying a material and the like according to claim 12, wherein said liquid level-responsive means comprises a float provided with a push rod and an electric contact disposed adjacent said push rod and actuated thereby for controlling said shutoff valve carried by said main pipe.

References Cited in the file of this patent

UNITED STATES PATENTS

| | | |
|---|---|---|
| 1,041,323 | Miles | Oct. 15, 1912 |
| 1,837,798 | Shipley | Dec. 22, 1931 |
| 1,913,659 | Chester | June 13, 1933 |
| 2,115,344 | Stacey | Apr. 26, 1938 |
| 2,208,443 | Ashley | July 16, 1940 |
| 2,300,417 | Hall | Nov. 3, 1942 |
| 2,436,693 | Hickman | Feb. 24, 1948 |
| 2,451,692 | Pugh | Oct. 19, 1948 |
| 2,453,859 | Pugh | Nov. 16, 1948 |
| 2,471,325 | Hickman | May 24, 1949 |
| 2,507,632 | Hickman | May 6, 1950 |
| 2,731,734 | Bancroft | Jan. 24, 1956 |